United States Patent
Vaissié et al.

(10) Patent No.: US 7,835,646 B2
(45) Date of Patent: Nov. 16, 2010

(54) HIGH-ORDER BRAGG FIBER DISPERSION CORRECTION

(75) Inventors: Laurent Vaissié, Oviedo, FL (US); James Francis Brennan, III, Winter Park, FL (US)

(73) Assignee: Raydiance, Inc., Petaluma, CA (US)

( * ) Notice: Subject to any disclaimer, the term of this patent is extended or adjusted under 35 U.S.C. 154(b) by 1029 days.

(21) Appl. No.: 11/440,607

(22) Filed: May 24, 2006

(65) Prior Publication Data

US 2006/0210275 A1 Sep. 21, 2006

Related U.S. Application Data

(63) Continuation-in-part of application No. 11/112,256, filed on Apr. 22, 2005, now Pat. No. 7,349,452.

(60) Provisional application No. 60/635,734, filed on Dec. 13, 2004, provisional application No. 60/636,376, filed on Dec. 16, 2004.

(51) Int. Cl.
*H04J 14/02* (2006.01)

(52) U.S. Cl. ............... 398/84; 398/160; 398/193

(58) Field of Classification Search ............... 398/84, 398/87, 90, 79–81, 160, 193
See application file for complete search history.

(56) References Cited

U.S. PATENT DOCUMENTS

| | | | |
|---|---|---|---|
| 6,760,356 B2 | 7/2004 | Erbert et al. | |
| 7,257,302 B2 * | 8/2007 | Fermann et al. | 385/125 |
| 2005/0105865 A1 * | 5/2005 | Fermann et al. | 385/122 |
| 2005/0175280 A1 | 8/2005 | Nicholson | |
| 2005/0265407 A1 * | 12/2005 | Braun et al. | 372/30 |
| 2005/0271340 A1 * | 12/2005 | Weisberg et al. | 385/123 |
| 2006/0120418 A1 | 6/2006 | Harter et al. | |
| 2006/0209908 A1 * | 9/2006 | Pedersen et al. | 372/6 |
| 2007/0273960 A1 * | 11/2007 | Fermann et al. | 359/333 |
| 2008/0232407 A1 * | 9/2008 | Harter et al. | 372/6 |

OTHER PUBLICATIONS

Limpert et al., "All Fiber Chirped-Pulse Amplification System Based on Compression in Air-Guiding Photonic Bandgap Fiber", Optics Express, Dec. 1, 2003, vol. 11, No. 24, pp. 3332-3337.

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

* cited by examiner

*Primary Examiner*—Dzung D Tran
(74) *Attorney, Agent, or Firm*—Carr & Ferrell LLP

(57) ABSTRACT

The present invention generally concerns the use of Bragg optical fibers in chirped pulse amplification systems for the production of high-pulse-energy ultrashort optical pulses. A gas-core Bragg optical fiber waveguide can be advantageously used in such systems to stretch the duration of pulses so that they can be amplified, and/or Bragg fibers can be used to compress optical signals into much shorter duration pulses after they have been amplified. Bragg fibers can also function as near-zero-dispersion delay lines in amplifier sections.

28 Claims, 9 Drawing Sheets

401

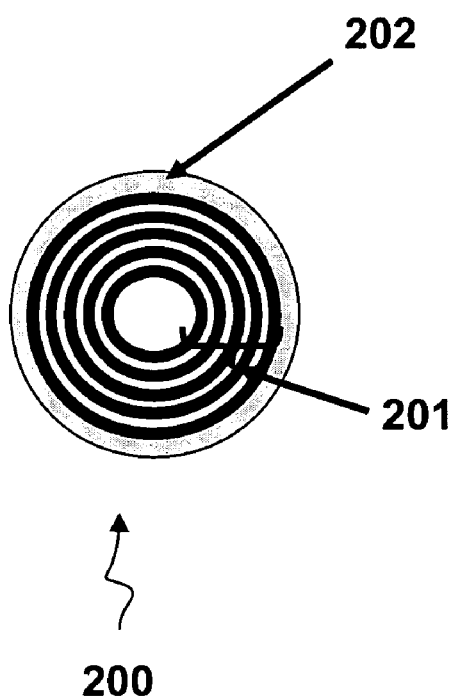
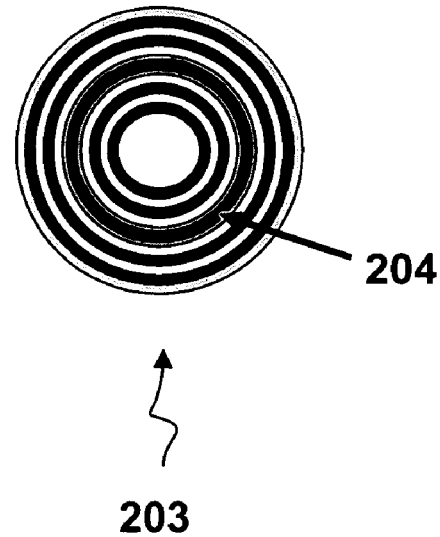
Figure 2a
Figure 2b 501    502

HIGH-ORDER BRAGG FIBER DISPERSION CORRECTION

CROSS-REFERENCE TO RELATED APPLICATIONS

The application is a continuation-in-part of and claims the benefit of, co-pending U.S. patent application Ser. No. 11/112,256, filed on Apr. 22, 2005 now U.S. Pat. No. 7,349, 452, entitled "Bragg Fibers In Systems For Generation Of High Peak Power Light," which, in turn, claims the benefit and priority of U.S. provisional patent applications:

Ser. No. 60/635,734, filed on Dec. 13, 2004, and entitled "Bragg Fibers For The Generation Of High Peak Power Light," and Ser. No. 60/636,376, filed on Dec. 16, 2004, and entitled "Bragg Fibers In Systems For The Generation Of High Peak Power Light."

The above patent applications are hereby incorporated herein by reference.

BACKGROUND OF THE INVENTION

Field of the Invention

The present invention relates to producing high-energy ultrashort optical pulses, and, in particular, to the use of Bragg fibers for stretching or compressing these pulses in an ultrashort-pulse laser system. Bragg fibers may also be used in the delay lines of optical amplifiers and for the delivery of high peak power pulses of light.

a. Ultrashort-Pulse Laser Systems

Ultrafast laser technology has been known and used for over 20 years. Chemists and physicists developed ultrafast lasers for the purpose of measuring extremely fast physical processes such as molecular vibrations, chemical reactions, charge transfer processes, and molecular conformational changes. All these processes take place on the time scales of femtoseconds (fsec, $10^{-15}$ sec) to picoseconds (psec, $10^{-12}$ sec). Carrier relaxation and thermalization, wavepacket evolution, electron-hole scattering, and countless other processes also occur on these incredibly fast time scales.

Optical science using ultrafast, ultrashort optical pulses has seen remarkable progress over the past decade. While definitions vary, in general "ultrashort" generally refers to optical pulses of duration less than approximately 10 psec, and this definition is used herein. Numerous applications of ultrashort pulses have been developed that would be otherwise impossible or impractical to implement with other technologies. With ultrashort pulses, researchers have investigated many highly nonlinear processes in atomic, molecular, plasma, and solid-state physics, and accessed previously unexplored states of matter. For example, coherent ultrashort pulses at wavelengths as short as 2.7 nm have been generated through harmonic upconversion.

Many applications of ultrashort-pulse ("USP") lasers make use of the very high peak power that each pulse momentarily provides. Although the average power from the laser may be quite moderate and the total energy within a pulse small, the extremely short duration of each pulse yields a peak, nearly instantaneous power that is very large. When these pulses are focused on a tiny spot, the high optical power is sufficient to ablate many materials, making a USP laser a useful tool for micromachining, drilling, and cutting. If needed, the precision of the material removal can even exceed that of the beam focus, by carefully setting the pulse intensity so that only the brightest part of the beam rises above the material ablation threshold. The material ablation threshold is the amount of energy density, or fluence, needed to ablate the material, often on the order of 1 J/cm². Optical pulses containing a much greater energy density are generally considered to be "high-energy" and this definition is used herein.

Ablation with a USP laser differs from longer duration pulse ablation techniques since most of the energy deposited on the surface by the ultrashort optical pulse is carried away with the ablated material from the machined surface, a process that occurs too rapidly for heat to diffuse into the surrounding non-irradiated material, thus ensuring smooth and precise material removal. For most materials, light pulses having a duration less than approximately 10 psec are capable of this non-thermal ablation when the pulse energy exceeds the ablation threshold of the material. Pulses with durations longer than about 10 psec can also ablate material if the pulse energy is greater than the ablation threshold, but thermal damage to the surrounding non-irradiated regions can occur.

Researchers have demonstrated non-thermal ablation techniques by accurately machining many materials, such as diamond, titanium carbide, and tooth enamel. In one interesting demonstration, USP lasers have been used to slice safely through high explosives; this is possible because the material at the focus is vaporized without raising the temperature of, and detonating, the surrounding material. Surgical applications also abound where ultrashort pulses are especially effective because collateral tissue damage is minimized. For example, researchers at Lawrence Livermore National laboratory have used ultrashort pulses to remove bony intrusions into the spinal column without damaging adjacent nerve tissue. Ophthalmic researchers have shown that USP lasers cut a smoother flap from a cornea than standard knife-based techniques and provide more control of the cut shape and location. There are numerous other applications as well. For the purposes of this invention, the term "ablation" used herein will refer to non-thermal ablation as discussed above and enabled by USP lasers, unless expressly indicated otherwise.

Nearly all high peak-power USP laser systems use the technique of chirped pulse amplification ("CPA") to produce short-duration, high-intensity pulses. Optical CPA was proposed by Mourou and others in the 1980s, as an extrapolation from previous CPA techniques used in radar microwave applications. Chirped pulse amplification is used to increase the energy of a short pulse while keeping the peak power of the pulse below a level that can cause damage to the optical amplifier. In this technique, the duration of the pulse is increased by dispersing it temporally as a function of wavelength (a process called "chirping"), thus lowering the peak power of the pulse while maintaining the overall power contained in the pulse. The chirped pulse is then amplified, and then recompressed to significantly re-shorten its duration.

By lengthening the pulse in time, the overall pulse can be efficiently amplified by an optical amplifier gain medium while the peak power levels of the chirped pulse remain below the damage threshold of the optical amplifier. The more a signal can be stretched, the lower the peak power, allowing for the use of either lower peak power amplifiers or more efficient amplifiers, such as semiconductor optical amplifiers. The CPA technique is particularly useful for efficient utilization of solid-state optical gain media with high stored energy densities, where full amplification of a non-chirped short duration pulse is not possible since the peak power of the pulse is above the damage thresholds of the amplifier materials. Techniques for generating ultrashort pulses are described in, e.g., Rulliere, C. (ed.), *Femtosecond Laser Pulses*, (Springer-Verlag, New York, 1988).

A typical CPA system is illustrated in FIG. 1 and works as follows. Ultrashort light pulses are generated at low pulse energies (typically less than 1 nJ) through the use of a mod-elocked laser oscillator, or "seed source" 101. These pulses are chirped with a chromatically dispersive system or a "stretcher" 102, which may be as simple as a standard silica optical fiber or a diffraction-grating arrangement. The dispersive system stretches the pulse temporally, increasing its duration by several orders of magnitude from, e.g., a duration under 1 psec to approximately 1 nanoseconds (nsec, $10^{-9}$ sec), or three orders of magnitude (1000 times). This decreases the pulse peak power by the same factor, three orders of magnitude in this example, so that the total power contained in the pulse remains approximately constant. Next, the stretched pulse is amplified by one or more stages of optical amplification 103 to increase the energy of the pulse. After amplification, the stretched pulse is compressed by a pulse compressor 104 to a pulse having a duration near the original input pulse duration. Finally, the ultrashort, high energy pulse is delivered to a desired location by some delivery mechanism 105. Graphical representations of the treatment of a single pulse are shown between the elements in FIG. 1 (not to scale).

Typically the compression is done with bulk optical elements involving prism and grating pairs or combinations thereof. Pulse-compression techniques of amplified chirped pulses have been well studied; see, e.g., the diffraction grating compressor discussed in U.S. Pat. No. 5,822,097, issued to Tournois. Pulse compression has also been explored in standard optical fibers, where the nonlinear optical interactions in the fibers are exploited to produce 'soliton compression'. These soliton techniques rely on the optical nonlinearities of the fiber to broaden the pulse spectrum and shorten the pulse duration. Soliton compression is typically used to compress pulses that are of the order of a few picoseconds in duration to sub-picosecond durations and the pulses energies are typically well under a few hundred nanoJoules for compression in optical fibers.

This current state of the art CPA for ultrafast systems is sufficient to satisfy the technical and performance requirements for many research applications of USP laser technology. However, there are some practical problems associated with commercializing applications of USP laser technology that have prevented USP technology from gaining mainstream acceptance.

For example, in standard silica optical fibers, the high peak power of a compressed high-energy pulse increases nonlinear optical effects in the fiber, such as self-phase modulation and stimulated Raman scattering, which distort the pulse and generally prevent pulse re-compression. (Raman scattering shifts the wavelength of a portion of the incoming light to a longer color and thereby separates that energy from the original signal.) Kerr effect nonlinearities, which include self-phase modulation, can cause pulse spectrum breakup, self focusing and catastrophic failure in the fiber. One method of reducing the nonlinear effects in an optical fiber compressor is to increase the effective area of the propagating mode to decrease the peak power in the fiber, but this technique has been limited to producing pulses with a maximum energy of only a few μJ. FIG. 3a shows an example of pulse degradation due to nonlinearities in a standard large core silica fiber.

There is another problem with using a standard silica optical fiber to stretch the optical signal. The standard dispersion for optical fiber is on the order of 17 psec/nm/km at 1550 nm (picoseconds of delay or temporal stretch per nanometer of wavelength per kilometer of fiber). To get the three orders of magnitude of stretch in the example above would require tens of kilometers of fiber. For this reason, commercial applications are generally only able to stretch a 1 psec pulse to about 200 psec, which does not allow for sufficient amplification for many applications. (It is possible to stretch such a pulse to 1 nsec by the use of a folded bulk grating configuration, but that still requires an internal optical path length of many meters. In addition, the folding process requires difficult optical alignments.)

Compression is also a problem, and the greater the stretching, the more compression is required. While optical gratings can also be used to compress optical signals, there are also limitations on the size of such gratings, thus limiting the amount of compression that can be achieved. Thus, the size of the USP laser system rapidly becomes prohibitive for many applications compared to its performance. For these reasons, in many cases commercial applications have been tabled due to the lack of practical USP laser sources. The need exists for well-packaged, turnkey USP laser systems that are cost effective, robust, and compact.

b. Bragg Fibers

Bragg fibers have been studied since the 1970s, e.g., Yeh, Yariv, & Marom, "Theory of Bragg fiber," *Journal of the Optical Society America* 68 (9), pp. 1196 (September 1978), but were not made until the late 1990's, when they became the subject of more recent investigations. See, e.g., Engeness, Ibanescu, Johnson, Weisberg, Skorobogatiy, Jacobs, and Fink, "Dispersion Tailoring And Compensation By Modal Interactions In Omniguide Fibers," *Optics Express* 11 (10), pp. 1175-1196 (19 May 2003) and Fink, Ripin, Fan, Chen, Joannopoulos, & Thomas, "Guiding Optical Light In Air Using An All-Dielectric Structure," *J of Lightwave Technology* 17 (11), pp. 2039-2041 (November 1999). Bragg fibers may also be known as Omniguide fibers, after one manufacturer. Many researchers have studied Bragg fibers for use as links in long-haul fiber optic communications systems, since the fibers were predicted to have very low intrinsic optical losses.

A typical Bragg fiber consists of at least two substantially annular rings surrounding an inner core filled with gas or liquid, each ring having a distinct refractive index. A pair of such substantially annular rings of differing refractive index is commonly referred to as a "bilayer." In some versions, the rings are formed from alternating regions of high contrast refractive index material, for example alternating layers of high and low dielectric materials. A radial light ray from the fiber center encounters a structure that acts as a planar dielectric stack reflector, also known as a Bragg mirror, which can reflect light effectively within a given range of wavelengths. It is generally considered better to have more rings, for example, 7 or 9 bilayers, to enhance the reflective properties of the waveguide and reduce losses.

FIG. 2a is a simplified diagram of a cross-structure of an exemplary Bragg fiber waveguide 200. Bragg fiber 200 consists of a core extending on the waveguide axis, normally of a low dielectric material such as air or other gas and having an index of refraction, surrounded by concentric substantially annular rings 201 having different indices of refraction, alternating to form bilayers in some embodiments. Typically a protective outer layer 202, often of a polymer material, is provided.

Recently, researchers such as Fink et al., have developed design tools and manufacturing processes to produce Bragg fibers with desired dispersive characteristics, which enable them to be used for dispersion management in optical communications systems, for example to provide very low dispersion or to compensate for unwanted dispersion during transmission of long haul telecommunication signals. Patents and publications on such developments based upon Fink's work include U.S. Pat. No. 6,603,911 by Fink et al.; U.S. Pat. No. 6,728,439 by Weisberg et al.; U.S. Pat. No. 6,788,864 by Ahmad et al.; and published U.S. Patent Application Ser. No. 20020176676 by Johnson et al.

Fink and others have demonstrated that light can propagate in these fibers with very low optical losses and low nonlinearities, and modeling results have shown that the dispersion of these fibers can be tailored to range over several orders of magnitude. Depending on the number and configuration of the ring cores around the core of the fiber, very high dispersion parameters may be obtained in such fibers by introducing a "defect" or "aberration" in one or more of the annular rings, for example, an irregular ring thickness in the periodic annular ring distribution. FIG. 2b shows a simplified diagram of a cross-structure of an exemplary Bragg fiber waveguide 203 in which a ring 204 of an irregular thickness has been introduced. The irregular ring 204 creates a resonant mode that couples to the central mode of the fiber over certain frequency ranges. At frequencies close to the frequency at which this coupling occurs there can be large dispersions, which can be tailored by controlling the thickness, refractive index, and radial position of the irregular ring 204.

SUMMARY OF THE INVENTION

The present invention uses Bragg fibers or other photonic bandgap fibers in a USP laser system in the stages of stretching, amplification, and/or compressing of light, for example, to obtain ultrashort pulses with high peak powers. Bragg fiber can be fabricated with very high dispersions, even greater than 10,000 psec/nm/km, which can be used for pulse stretching, e.g., from 1 psec to 1 nsec or more, or compressing, from 1 nsec to 1 psec or less.

In one embodiment, the present invention provides a method of producing an ultrashort high-energy optical pulse, comprising generating a chirped optical signal; amplifying the chirped optical signal; and compressing the optical signal into an ultra-short duration optical pulse, wherein at least one of the steps of generating the optical signal and compressing the optical signal includes introducing the optical signal into a Bragg-fiber waveguide, the waveguide comprising an inner core region in which the optical signal is confined, and a plurality of concentric annular regions of differing refractive indices surrounding the inner core region.

Thus, introducing an optical signal into a Bragg-fiber waveguide to stretch (chirp) it before amplifying it, or introducing an amplified chirped signal into a Bragg-fiber waveguide to compress it, or doing both are all within the present invention.

In some embodiments, concentric substantially annular regions may have alternating refractive indices of higher index to lower index, or vice-versa, such that the Bragg-fiber waveguide has a dispersion greater than 10 ps/nm/km. The inner core may be filled with gas, e.g., ambient air, which allows linear compressing of high-energy pulses without the pulses passing through optical windows. The use of substantially annular regions, as opposed to non-annular microstructured regions, allows straightforward manufacture of the waveguides, although microstructured regions, which act as annular regions, may also be made.

The present invention also provides a method of delivering an ultrashort high-energy optical pulse to a surface, comprising: generating a chirped optical signal; amplifying the chirped optical signal; compressing the optical signal into an ultrashort duration optical pulse; and delivering the ultrashort optical pulse to a work surface with a Bragg-fiber waveguide, the waveguide comprising an inner core region in which the optical signal is confined, and a plurality of concentric annular regions of differing refractive indices surrounding the inner core region.

In another embodiment of the present invention, a diffractive optical element ("DOE"), an optical element that changes amplitude, phase and/or polarization of a light beam using diffraction properties of light, as opposed to refraction, or a sub-wavelength gratings ("SWG"), a particular type of DOE, may be used to transmit light into or out of a Bragg-fiber waveguide. Such a DOE can be used to tailor the launched mode and polarization, which is output from conventional bulk optics or silica fibers into the Bragg-fiber waveguide, or the diffractive optic may be used to shape the output from the Bragg-fiber waveguide for appropriate launching into other system subcomponents.

Thus, Bragg-fiber waveguides can be used in a high-energy USP laser system, with the Bragg-fiber waveguides designed to have very high dispersion of one type to stretch pulses and very high dispersion of an opposite type to compress pulses. Using Bragg-fiber waveguides of high dispersion allows the optical signals to be stretched and compressed with relatively short lengths of Bragg-fiber waveguide, thus avoiding the necessity for the long lengths of traditional silica fiber or large optical gratings, allowing for extremely compact high-energy USP laser systems to be built.

In another embodiment of the present invention, a method of providing essentially dispersion-free time delays in a USP laser system comprises the steps of: generating a chirped optical signal; regeneratively amplifying the chirped optical signal with an optical loop containing an essentially dispersion-free Bragg-fiber waveguide, the waveguide comprising an inner core region in which the optical signal is confined, and a plurality of concentric annular regions of differing refractive indices surrounding the inner core region; and compressing the optical signal into an ultrashort duration optical pulse.

In another embodiment of the present invention, a method of stretching an optical signal using the present invention uses Bragg fibers, fiber Bragg gratings, and/or modulators for stretching and Bragg fibers for compressing light pulses in a USP laser system to obtain ultrashort pulses with high peak powers.

In one embodiment, the present invention provides a method of optimizing the dispersion of the optical pulse by producing an ultrashort high-energy optical pulse, comprising generating a chirped optical signal; amplifying the chirped optical signal; and compressing the optical signal into an ultra-short duration optical pulse, wherein at least one of the steps of generating the optical signal and compressing the optical signal includes introducing the optical signal into a Bragg-fiber waveguide, the waveguide comprising an inner core region in which the optical signal is confined, and a plurality of concentric annular regions of differing refractive indices surrounding the inner core region.

Various embodiments of the invention include a CPA system comprising a photonic bandgap fiber. The photonic bandgap fiber may be configured for changing dispersion, compression, or stretching of an optical pulse. In some of these embodiments, additional components are included to further optimize the temporal dispersion of the optical pulse.

In various embodiments, dispersion is optimized by selecting components with approximate opposite dispersion characteristics, manufacturing components with opposite dispersion characteristics, or adding additional components to have an accumulative effect of opposite dispersion characteristics.

System optimization may result in the approximate cancellation of the dispersion characteristics.

The system optimization discussed herein can be directed toward a variety of different operational parameters. For example, optimizing the CPA system such that the output pulse delivers a specified amount of power to a target surface. In various embodiments, the net dispersion of the system is optimized to control the temporal width of an output pulse, and/or control the fluence of a pulse while maintaining an approximate average pulse energy. In these embodiments, the output pulse may be optimized to ablate a material at a target surface.

In various embodiments the output pulse has a duration of less than 10 psec. In other embodiments the output pulse has a duration of less than 1 psec. Additionally, in various embodiments, the output pulse has an energy of greater than 10 nJ. In other embodiments the output pulse has an energy exceeding 100 nJ. In these embodiments, the output pulse may be used to ablate a material at a target surface. A1

Various embodiments of the invention include a system comprising an optical signal generator configured to generate an optical signal; an optical signal stretcher configured to stretch the optical signal by dispersing it temporarily as a function of wavelength, thus generating a stretched optical signal; an amplifier configured to amplify the stretched optical signal, thus generating an amplified optical signal; and a Bragg fiber configured to compress the amplified optical signal to generate an optical pulse.

A method of producing an optical pulse comprising generating an optical signal; stretching the optical signal to generate a stretched optical signal; amplifying the stretched optical signal to generate an amplified optical signal; and compressing the amplified optical signal to generate an optical pulse using a Bragg fiber.

BRIEF DESCRIPTION OF THE DRAWINGS

FIGS. 2a and 2b are simplified diagrams of the cross-structures of Bragg fiber waveguides of types that may be used in the present invention.

FIG. 3a shows an example of degradation due to nonlinearities in a standard large core silica fiber. The initial pulse energy is 10 μJ and the pulse width is 10 ps. FIG. 3b shows the compression of the same pulse in a hollow core fiber with a dispersion parameter similar to standard silica fiber.

DESCRIPTION OF PREFERRED EMBODIMENTS

Figure 1:
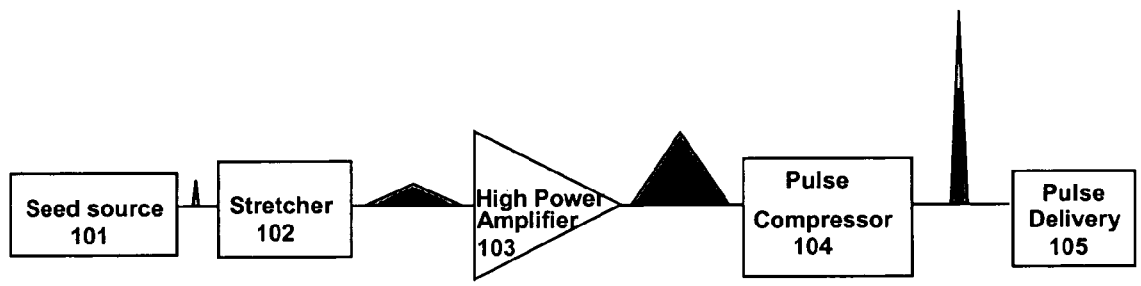
FIG. 1 is a block diagram of a typical chirped pulse amplification system.
Figure 3A:
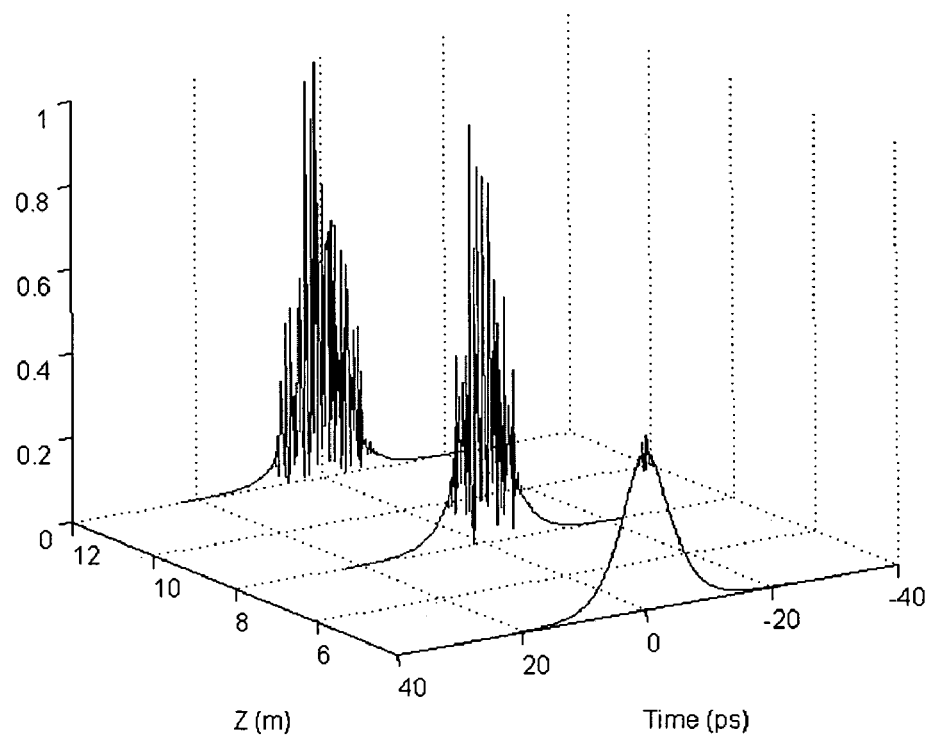
FIGS. 3a and 3b show an example of pulse compression.
Figure 3B:
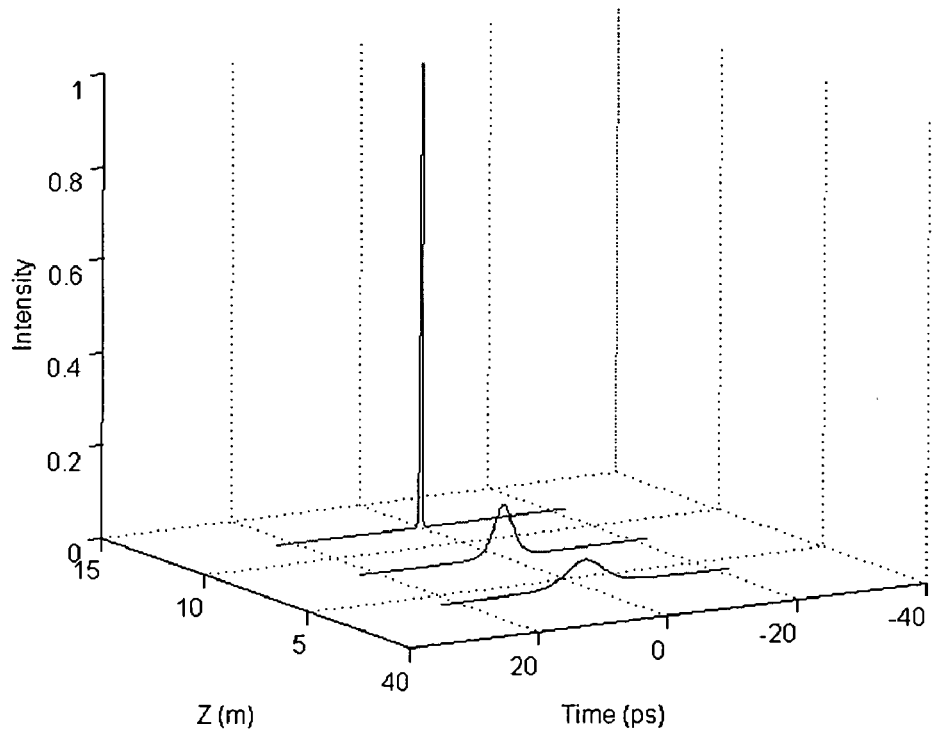

Photonic bandgap fiber ("PBF") is capable of transmitting light in hollow cores or with confinement characteristics not possible in conventional optical fibers. In general, PBFs have a cross-section microstructured from two or more materials, most commonly arranged periodically over much of the cross-section, usually as a "cladding" surrounding a core (or several cores) where light is confined. Examples of PBFs include photonic-crystal fiber, holey fiber, hole-assisted fiber, and Bragg fiber. The embodiments discussed herein in relation to Bragg fibers may alternatively include other PBFs.

The different types of PBFs can be distinguished by physical or effective properties. For example, Photonic-crystal fibers confine light by band gap effects created by a 2-dimensional hole lattice; Holey fiber also use air holes in their cross-sections, but generally the holes are larger than in photonic crystal structures; Hole-assisted fibers guide light by a conventional higher-index core modified by the presence of air holes; and Bragg fibers are formed by concentric rings of multilayer film.

The present invention uses Bragg fibers of very high dispersion to accomplish stretching, amplification, and compression of an optical pulse in a relatively small length of fiber compared to the prior art. While optical fiber amplifier technology has improved dramatically in recent years and chirping with standard silica optical fiber is common, as discussed above practical compression within optical fibers has been an elusive goal. By reducing the amount of fiber required and propagating the signal primarily in a gaseous fiber core, the present invention allows for compact USP laser systems.

As mentioned earlier, the high peak power of a compressed high-energy pulse increases nonlinear optical effects in standard silica optical fiber, such as self-phase modulation and stimulated Raman scattering, distorting the pulse and generally preventing pulse re-compression. These optical nonlinearities can also cause pulse spectrum breakup, self focusing and catastrophic failure in the fiber. Bragg fibers can be constructed that have very high dispersion, yet provide extremely low loss of the optical signal in the hollow core and very low nonlinear interactions. Using this type of fiber reduces the length of fiber needed to accomplish the compression and thus the interaction length that the pulse has with the fiber material, further reducing nonlinear optical effects.

In one embodiment, the present invention uses a Bragg-fiber waveguide with an air or gas core surrounded by a plurality of substantially concentric annular regions of material with alternating refractive indices. As before, using a greater number of bilayers, for example, 7 or 9, increases the extent to which the structure acts as a thin film stack and reflects the light in the core.

Research has shown that by introducing "defects" or irregularities into the annular regions, such that the refractive indices do not simply alternate, the dispersion of these fibers can be tailored to range over several orders of magnitude. This feature exploits a phenomenon referred to as "anti-crossings" in solid state physics and can be used to provide the high dispersion and low nonlinearities in Bragg fibers that are ideal for pulse stretching and compression in a CPA system. The irregular ring (or rings) can create a resonant mode that couples to the central mode of the fiber over certain frequency ranges. At frequencies close to the frequency at which this coupling occurs there can be large dispersions. The irregularity may be a change in thickness of one of the annular regions, or a change to the refractive index of one of the annular regions. Fink et al. have demonstrated that the depth of the defect, i.e., its position in structure, the size of the defect and the overall scaling of the structure all affect the dispersion characteristics of the fiber. Dispersion characteristics in the range of 10,000 ps/nm/km are possible.

Figure 4A:
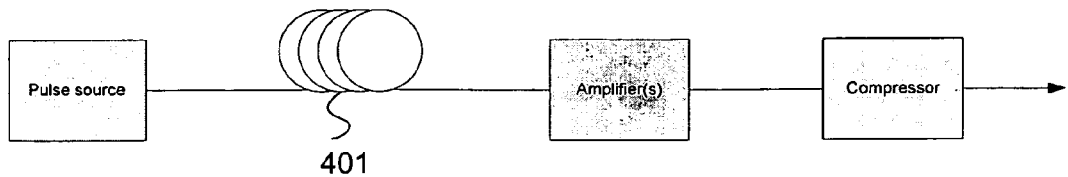
FIGS. 4a to 4e are block diagrams of chirped pulse amplification systems that include Bragg fiber in different parts of the system.
Figure 4B:
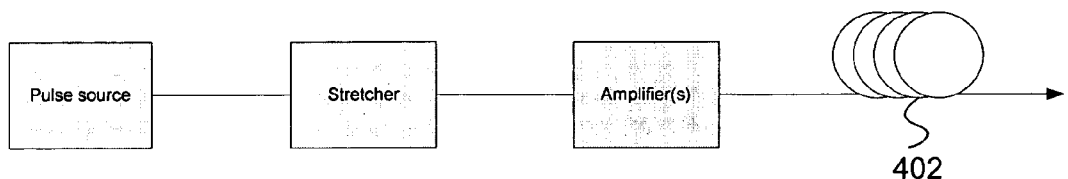
Figure 4C:
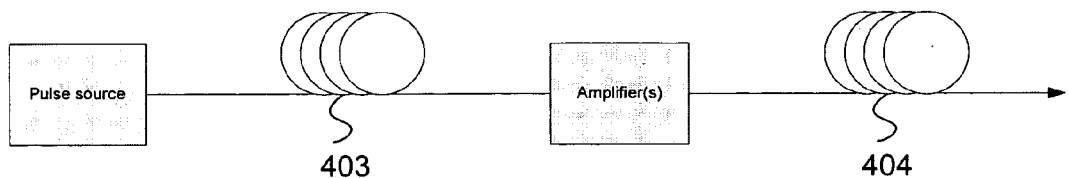

In one embodiment, the present invention provides a method of producing an ultrashort high-energy optical pulse, by using the Bragg-fiber waveguide in place of conventional silica fiber for stretching the signal, and/or compressing the signal in place of the more traditional components. The method otherwise follows a conventional CPA process, as shown in FIGS. 4a to 4c. An ultrashort, low energy optical pulse is generated and then stretched or chirped, and the chirped optical signal is then amplified and then compressed into an ultra-short duration optical pulse. To fall within the present invention, at least either the stretching of the optical pulse or the compressing of the amplified the optical signal are accomplished by introducing the optical signal into a Bragg-fiber waveguide, although both steps may be done with Bragg-fiber waveguides if desired. FIG. 4a shows the use of Bragg fiber 401 as a stretcher in such a system, FIG. 4b shows the use of Bragg fiber 402 as a compressor, while FIG. 4c shows the use of Bragg fibers 403 and 404 as a stretcher and compressor, respectively.

Figure 4D:
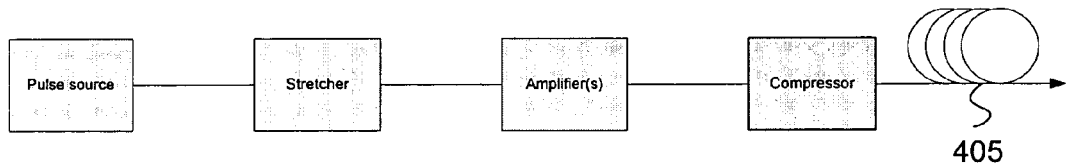
Figure 4E:
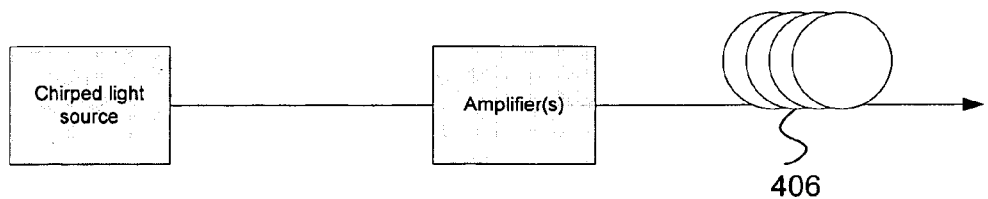

While the above discussion concerns a single pulse, the present invention also includes the use of a train of pulses by multiple application of the steps of the described method. The optical signal may be generated in a variety of ways, for example, from a seed source as discussed in the prior art, or from a light source that is already chirped. For example, a constant amplitude signal may be frequency modulated to create a chirped signal. In such a case, stretching of the signal as in CPA systems is generally not required. FIG. 4e illustrates such a system, in which the frequency-modulated signal goes directly to one or more optical amplifiers, and is then compressed into pulses after amplification by a Bragg-fiber waveguide or other waveguide as described herein.

The stretching of the initial optical pulse may be accomplished by designing the Bragg-fiber waveguide to delay the 'redder', or longer wavelength, portion more than the 'bluer', or shorter wavelength, portion of the pulse, while compression of the amplified signal may be done with a Bragg-fiber waveguide designed to have a dispersion that is opposite that of the stretcher, where the 'bluer' wavelengths are delayed more. Of course, the CPA system could be designed to delay the bluer wavelengths in the stretcher and compress with the redder wavelengths being delayed.

In some embodiments, the concentric annular regions may have alternating refractive indices of higher index to lower index, or vice-versa. The inner core may be filled with gas, e.g., ambient air, which allows linear compressing of high-energy pulses without the pulses passing through optical windows. A common method of manufacturing Bragg fiber involves winding a bilayer sheet of material onto a mandrel and then removing the mandrel, where the bilayer is comprised of at least one layer of the high index material and one layer of the low index material. Strictly speaking, the cross-section of these realized fibers have a continuous spiral of bilayer, and thus the structure is only substantially annular as opposed to truly concentric rings, but for all practical purposes perturbation due to the spiraling can be ignored and the fibers can be considered as having concentric rings. Other methods of fabrication exist where the preform is made by an extrusion process in which a stack-of-plates, composed of alternating disks of, for example, chalcogenide glass and a polymer, is extruded through a die into both solid and hollow-core structures. Laminar flow during the extrusion forces the periodicity from an axial to a radial orientation in the final extruded preform, as described by D J Gibson and J Harrington in "Extrusion of hollow waveguide preforms with a one-dimensional photonic bandgap structure," J Appl. Phys 95 (8) (15 Apr. 2004) pp. 3895-3900.

The use of annular regions or a sheet of bilayer material, as opposed to non-annular microstructured regions, allows straightforward manufacture of the waveguides, as opposed to other specialty optical fiber waveguides that create a fiber cross-section containing a two-dimensional array of air holes by, for example, bunching microtubes together. These other fibers go by various names such as "holey" fiber, photonic crystal fiber ("PCF"), or microstructured fiber, and also use a photonic bandgap mechanism to guide light, but in a different manner than that of Bragg fibers.

Other researchers have explored the use of highly dispersive designs of PCF for use in chirped pulse amplification systems and learned that only very low output pulse energies were possible, e.g., less than 1 µJ per pulse, since the propagating light was distorted by nonlinear optical processes through the fiber. Highly dispersion PCF fiber functions by coupling an inner propagating core-mode to surface modes, which fundamentally have high optical loss, so a highly dispersive PCF fiber is necessarily also optically lossy. Thus, traditional dispersive PCF fiber suffers too much loss to be useful in USP systems. Bragg fiber does not have these losses since the high dispersion is made by coupling the core mode to a mode in the defect layer.

Figure 5A:
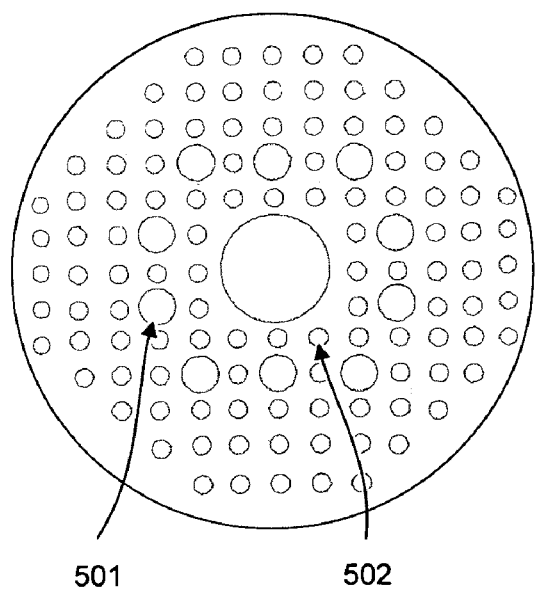
FIGS. 5a and 5b show alternative fiber structures that may be used in some embodiments of the present invention.

It is possible to construct such PBF fibers in such a way as to achieve the same effect as the Bragg fibers discussed herein, and thus these PBF fibers may also be suitable for use in the present invention. This can be done by surrounding the core with alternating layers of different sized holes, such that each layer of holes has a distinct diffractive index and two such layers of different sized holes forms a bilayer. Such a structure is shown in FIG. 5a, where fiber 500 has alternating layers 501 and 502, each having different sized holes, surrounding a core. A "defect layer" may be inserted by introducing a layer of holes of a third size, and, similarly to the discussion above, can create a region where the refractive indices do not simply alternate.

Figure 5B:
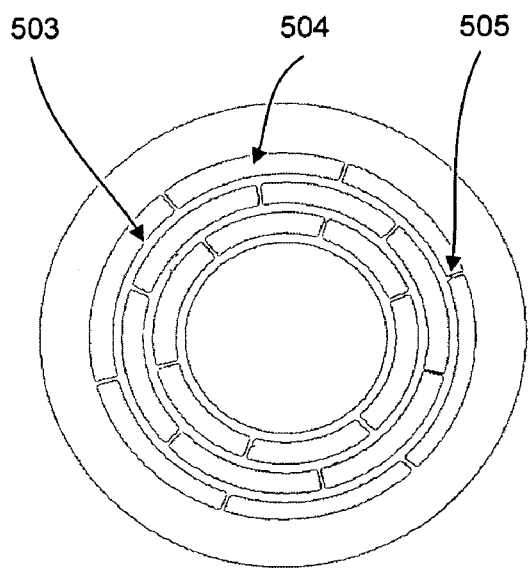

Another fiber embodiment is shown in FIG. 5b. In this embodiment, a material 503 having a refractive index different from air or some other gas is arranged in concentric annular regions, or, as above, a single spiral of material. Between each layer of the material and the next is a layer of air or gas 504. In order to prevent the material 503 from contacting itself and yielding simply a greater thickness of material of a single refractive index, supports 505 are included to keep each layer of material 503 separate from the next. While this structure is not considered to contain bilayers, it can have the same effects as a Bragg fiber due to the alternating refractive index. Such fiber has been made, but not used for compression.

The present invention also provides a method of delivering an ultrashort high-energy optical pulse to a surface. In one embodiment, shown in FIG. 4d, an ultrashort, high energy optical pulse is generated by any means desired, and then delivered to a surface through a Bragg fiber waveguide 405. In another embodiment, shown in FIG. 4e, an ultrashort optical pulse is generated, chirped and amplified, and then delivered to a work surface with a Bragg-fiber waveguide 406, which compresses the amplified signal to an ultrashort high-energy pulse. Nonlinear interactions, which can destroy pulse quality and prevent it from being recompressed to an ultrashort pulse, can be avoided by the use of Bragg fiber. Most of the modal intensity is confined inside the air core, which limits the effects of nonlinearities in a CPA system. A USP system can be made with a very short length of Bragg fiber as the compressor, for example, with less than 5, 10, 15, or 25 centimeters. An all fiber compressor will make the CPA system much smaller than current systems, and fiber delivery makes applications of USP technology possible in previously inaccessible locations, such as during noninvasive surgical operations.

Another embodiment of the present invention utilizes a diffractive optical element ("DOE"). A DOE is an optical element that changes amplitude, phase and/or polarization of a light beam using diffraction properties of light, as opposed to refraction. A particular subset of DOEs, called sub-wavelength gratings ("SWGs"), use periodic structures designed such that no diffracted orders are allowed to propagate after interaction with the structure. These structures can be approximated by an artificial medium that has been shown to create efficient antireflection structures and light polarizers. Such structures are described in the literature, e.g., Mait & Prather, eds., *Selected Papers On Subwavelength Diffractive Optics*, (SPIE Milestone series Vol. MS 166).

In one embodiment of the present invention, a DOE may be used to transmit light into or out of a Bragg fiber. Such a DOE can be used to adjust the mode and polarization launched from the output from conventional bulk optics or silica fibers into the Bragg fiber, or the DOE may be used to shape the output from the Bragg fiber for appropriate launching into other system subcomponents. The pulse to be launched into the Bragg fiber may come straight from an amplifier, which may include typical rare-earthed doped fiber amplifiers (e.g. Er or Er:Yb co-doped) and/or solid state amplifier systems (e.g. Nd:YAG, Cr:YAG, etc.), or the pulse may be first launched from the amplifier into other optical subsystems and then into the Bragg fiber. For better launching efficiency into select modes of the Bragg fiber (e.g., the $TE_{01}$ mode for low optical loss), sub-wavelength phase grating polarization converters can be used to convert the linear polarization to circular polarization at very high efficiency (e.g. over 95%). The present invention is not dependent on using DOEs as launch elements into or out of the Bragg fiber. The DOEs as launch elements are disclosed as one of many possible methods of launching into the fibers.

Alternatively, an SWG coupling element can be used to transmit light into or out of the Bragg fiber. Such a component may also be used inside a regenerative amplifier. The efficiency of coupling the amplifier output pulses into a Bragg fiber compressor in a CPA system is very important as inefficiencies at this stage significantly increase the size and costs, both capital and operating, of the system. The combination of a mode that can be efficiently coupled and an efficient SWG for converting a linearly polarized output of a power amplifier to that efficient mode significantly increases efficiency and reduces system cost and size.

One method of controlling the polarization of a light beam with SWGs utilizes metal stripes that are deposited on a dielectric or semiconductor substrate to create a wire-grid polarizer; see, e.g., Bird and Parrish. "The Wire Grid As A Near-Infrared Polarizer", *J. Optical Society of America* 50 (9), pp. 886-891 (September 1960). In this case, the structure acts as a polarizer by transmitting radiation with polarization parallel to the conducting metal stripes and attenuates those that are perpendicular to the stripes. It has also been demonstrated that one can control spatially the polarization of an arbitrarily polarized input beam by locally varying the orientation of a metallic one-dimensional periodic structure in a two-dimensional plane; see, e.g., Bomzon, Kleiner, and Hasman, *Optics Letters* 26 (1), pp. 33-35 (1 Jan. 2001). Polarization manipulation with metal stripes relies on polarization-dependent loss and thus necessarily attenuates the incoming optical beam.

Figure 6:
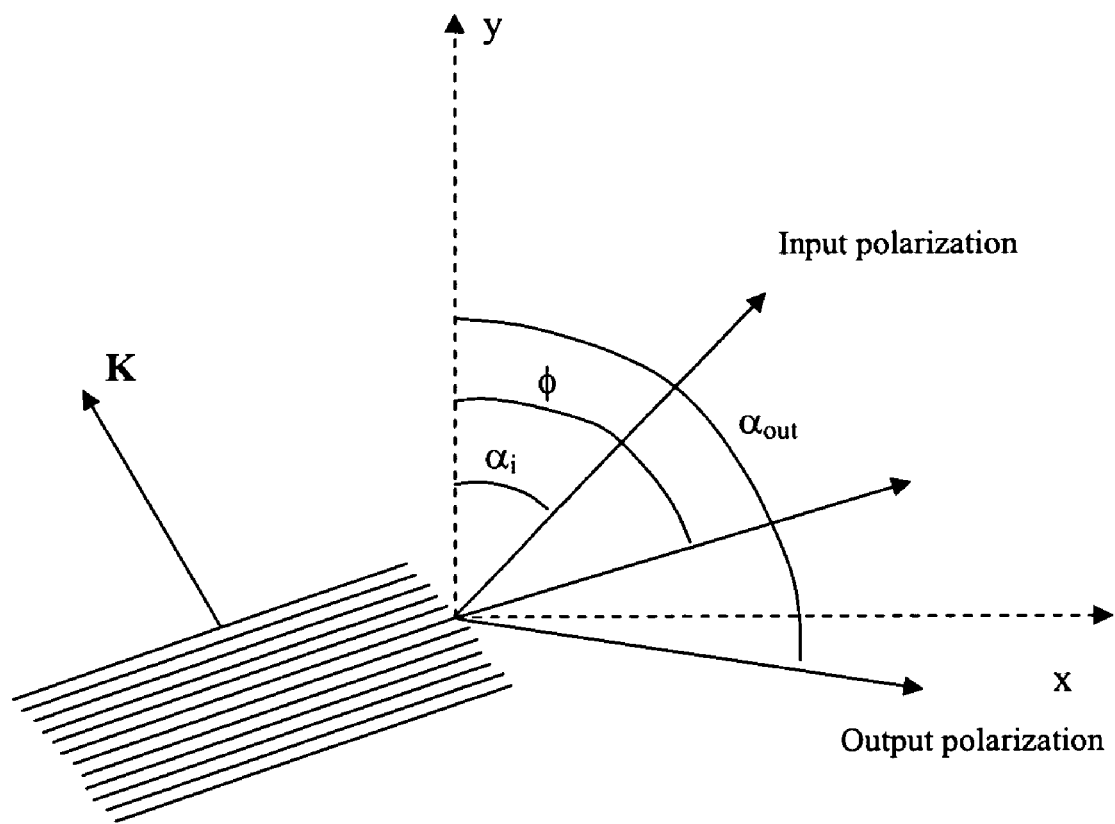
FIG. 6 shows the polarization rotation of an incident beam through a sub-wavelength grating which may be varied spatially to map the polarization of the output beam.

Other SWG structures can be used to transform the polarization states of incoming polarized beams. A material can be structured to exhibit an "artificial birefringence," which can be used to control the polarization of an incident beam. In this case, the grating depth is chosen appropriately to create a quarter-wave or half-wave plate; see, e.g., Cescato, Gluch, and Streibl, "Holographic Quarter Wave Plates," *Applied Optics* 29 (1990). The amount of polarization rotation is proportional to the angular difference between the input beam polarization direction and the SWG grating vector, as shown in FIG. 6. Artificial birefringent structures are detailed by Davidson, Friesem, and Hasman, "Computer-Generated Relief Grating As Space-Variant Polarization Elements," *Optics Letters* 17. (1992), and by Mohammed, *Selective Mode Excitation In Specialty Waveguides Using Micro Optical Element*, PhD dissertation, University of Central Florida, Orlando, Fla. (2004). In Mohammed's work, an artificial birefringent DOE is used to couple light into a hollow core metallic waveguide. However, the grating grooves described in Mohammed's work are not continuous, creating additional diffraction and limiting the efficiency of the element. In a preferred embodiment of this invention, the grating vector of the SWG varies continuously to increase the device efficiency.

Such SWGs can be fabricated on, but are not restricted to, dielectric substrates such as fused silica or semi-conductor material (e.g. silicon or GaAs). Depending on the input polarization, the sub-wavelength structure may be created by evaporating metal wires selectively on the substrate using a lift-off technique, where the device is to be used as a polarizer, or etched into the material using dielectric or metal masking techniques commonly used in the semiconductor industry, for use as retardation plates. The master pattern may be written preferably by electron beam lithography and then reproduced by standard replication techniques. The SWG can also be combined with other DOEs integrated on the same wafer to match a desired combination of amplitude, phase and polarization for the light beam. Such a combination can include a front to back alignment of lenses with an SWG or multiplexing the SWG structure directly with another DOE.

In one embodiment, the optical signal is coupled into the circularly-polarized, higher-order $TE_{01}$ of an optical fiber, for coupling into a Bragg fiber compressor. However, subwavelength gratings can be used for polarization conversion for coupling into Bragg fibers for other applications as well, especially in CPA systems to take advantage of dispersion and spatial properties of certain Bragg fiber modes.

In another embodiment of the present invention, an SWG is used to convert the polarization of a light beam after compression into an ultrashort high-energy pulse before focusing with a lens element. The lens element can be refractive or diffractive. In one embodiment, the lens and the SWG are fabricated on the same substrate.

The Bragg fiber enables very high dispersion suitable for pulse stretching or compression without adverse nonlinear effects. The Bragg fiber mode can be excited by the SWG element described herein. FIG. 6 shows the polarization rotation of an incident beam through an SWG, where the orientation of the grating grooves may be such that:

$$\phi = \frac{\alpha_i + \alpha_{out}}{2}$$

The orientation of the SWG is varied spatially to map the polarization of the output beam to the desired Bragg fiber mode.

Bragg fibers can be produced by a number of methods, including chemical vapor deposition ("CVD"), liquid phase epitaxy ("LPE"), electrophoretic deposition ("EPD"), electroplating and others. Fink et al. describe certain techniques, but EPD also works well. EPD allows a uniform deposition of both metals and insulators to achieve the high contrast index of refraction needed to create a Bragg fiber and selectively induce the defects in the structure that yield the desired dispersion characteristics.

Figure 7:
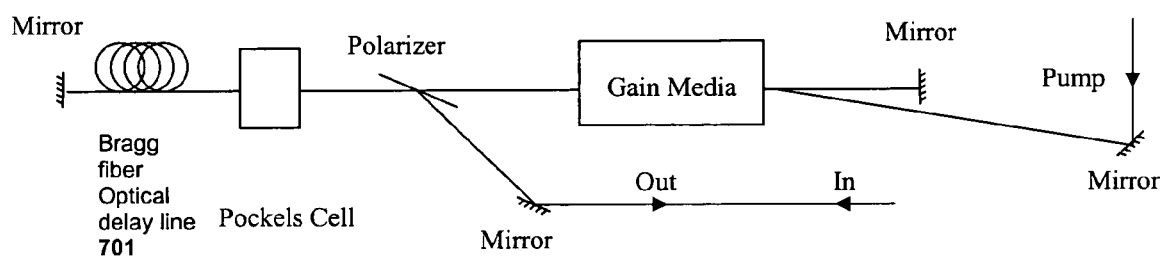
FIG. 7 is a block diagram of a regenerative amplifier configuration that may be used in one embodiment of the present invention.

As shown in FIG. 7, Bragg fibers can also be used as delay lines in the amplifier sections of a CPA system. Many USP lasers utilize a regenerative amplifier configuration to obtain the pulse energies required to ablate material. Typically regenerative amplifiers include a gain medium with a delay line to circulate the stretched pulse through the amplifier material several times. This delay line may be comprised of an optical switch to couple light into and out of the delay loop, and passive components to complete the loop. The optical switch may be an electro-optic (Pockel cell), acousto-optic, or other form of optical switch. The passive optical components may include combinations of mirrors, lenses, polarizers, and other elements. The spacing between the optical elements is determined by the desired delay, which is often dictated by the response time of the switches and length of the optical pulse.

The response time of an optical switch may range from a few nanoseconds to hundreds of nanoseconds. Each nanosecond of switching time requires about a foot of optical path, which increases the size of the amplifier delay system and associated costs. In conventional approaches, reducing the size of the optical switch requires implementing a folded cavity design that utilizes more mirrors and passive components to reflect the light many more times in a smaller package while maintaining the same optical path length. Folded cavities can use several mirrors to achieve a compact size. If each mirror is 96% reflective and the light is reflected 5 times, the overall efficiency of the delay line is approximately $(0.96)^5$ or 81%, which may be more than the gain of the optical gain medium in a single pass. However, since a mirror is less than 100% reflective and no media transmits completely without loss, a folded cavity reduces overall efficiency each time the optical pulse is reflected off of a surface or transmitted through a media (other than the gain media). The use of Bragg fibers can reduce this problem. Long optical time delays can be accomplished in a compact space by coiling a Bragg fiber 701. The Bragg fiber used in this delay line would be designed to have low optical loss and low dispersion, which avoids distorting the pulse.

As discussed herein, Bragg fibers, as well as other photonic bandgap fibers, may be fabricated to have very high dispersions with low optical losses and may be used to perform the stretching and/or compression in a CPA system. However, in order to optimize the output of the CPA system, one should control the total dispersion of the system, which includes the linear dispersion (first-order), dispersion slope (second-order), dispersion quadrature (third-order), etc.

Various embodiments of the invention include methods of controlling the total dispersion within a CPA system. In one approach, the total dispersion is controlled by selecting one or more components that have dispersion characteristics matched, e.g. complimentary, to one or more other components of the system. In another approach, the total dispersion is controlled by manufacturing a component that has matched dispersion characteristics relative to one or more other components. In a further approach, the total dispersion is controlled by adding an extra component that has dispersion characteristics configured to adjust the total dispersion within the system to a desired value.

In some embodiments, a stretcher and a compressor of a CPA system are selected to have opposite and matched dispersion characteristics. In some embodiments, one component is selected based on having dispersion characteristics complimentary to a combination of one or more other system components, e.g., selecting a stretcher with certain dispersion characteristics based on the combined dispersion characteristics of an optical signal generator, an amplifier, and a compressor. In some embodiments, the compressor may be selected for its dispersion characteristics based on the combined dispersion characteristics of the one or more other system components.

In another approach to optimizing system dispersion, a component is manufactured to have dispersion characteristics opposite to one or more other components of the CPA system. This allows the manufactured component to be tailored to have dispersion characteristics complimentary to one or more other system components. In an example of this embodiment, a fiber Bragg grating is manufactured with dispersion characteristics complimentary to the combined dispersion characteristics of amplifier(s) and a compressor.

In a further approach to optimizing system dispersion, an extra component having dispersion characteristics complimentary of one or more system components is added to the system for the purposes of controlling dispersion. This approach is distinguished from other methods in that the approach introduces an additional component into the CPA system. For example, in some embodiments, a fiber Bragg grating is added between an optical signal generator and an amplifier whereby the fiber Bragg grating has dispersion characteristics complimentary to one or more system components. In optimizing the total system dispersion, the effect of the additional component may be either to stretch or compress the optical signal. The addition of an additional element may allow more precise control over the total dispersion of the system relative to other methods of dispersion control discussed herein and may ultimately yield an optimized output pulse duration.

Figure 8A:
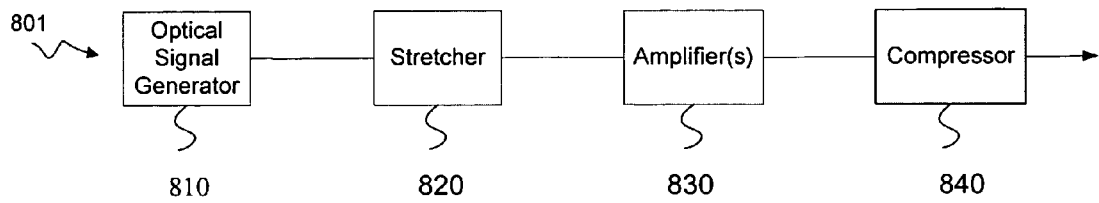
FIGS. 8a to 8g are block diagrams of chirped pulse amplification systems including photonic bandgap fibers, according to various embodiments of the invention.

FIG. 8a represents an embodiment of the current invention, generally designated 801, comprising an optical signal generator 810 configured to generate an optical signal, a stretcher 820 configured to stretch the optical signal, one or more amplifiers 830 configured to amplify the stretched optical signal, and a compressor 840 configured to compress the amplified optical signal to generate an optical pulse. The stretcher 820 can be selected or manufactured to closely match the opposite dispersion characteristics of the compressor 140 to reconstruct the optical signal to make the optical pulse. Additionally, the stretcher 820 may be a polarization maintaining component to ensure optimal performance in the amplifier(s) 830.

Figure 8B:
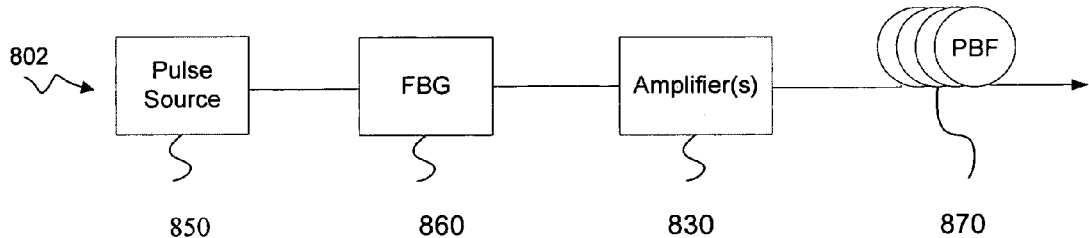

FIG. 8b represents another embodiment, generally designated 802, of the current invention comprising a fiber Bragg grating 860 configured to stretch the optical signal and a photonic bandgap fiber 870 configured to compress the optical signal. Because fiber Bragg grating 860 can, in general, be more accurately tailored to meet desired dispersion profiles in comparison to Bragg fibers, Bragg fiber grating 860 can be used to fine-tune the dispersion of the system 802.

Figure 8C:
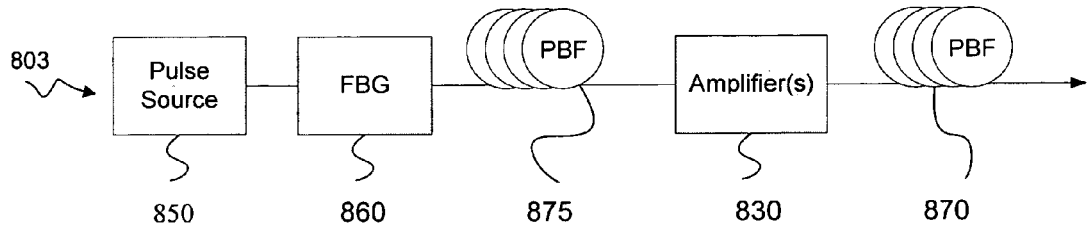

FIG. 8c represents a further embodiment, generally designated 803, of the current invention comprising a fiber Bragg grating 860 and a first photonic bandgap fiber 875 configured to stretch the optical signal, and a second photonic bandgap fiber 870 configured to compress the optical signal. In this embodiment of the invention, the stretcher 820 comprises a fiber Bragg grating 860 and a photonic bandgap fiber 875. Because most fiber Bragg grating lengths and, thus, dispersion ranges are limited, combining the photonic bandgap fiber 875 with the fiber Bragg grating 860 increases the dispersion range of the stretcher 820 to be similar in magnitude of the photonic bandgap fiber 870 of the compressor 840. Thus, in FIG. 8c the advantage of the fine dispersion control obtained by using fiber Bragg grating 860 is combined with the advantage of a large dispersion range obtained by using photonic bandgap fiber 875.

In some embodiments, both the fiber Bragg grating 860 and the photonic bandgap fiber 875 may be configured to stretch the optical signal. In other embodiments, the photonic bandgap fiber 875 may be configured to stretch the optical signal, while the fiber Bragg grating 860 may be configured to compresses the optical signal. In some embodiments, the dispersion contribution of the fiber Bragg grating 860 is less than the dispersion contribution of the photonic bandgap fiber 875. In some embodiments, the fiber Bragg grating is selected based on having dispersion characteristics matched to the total dispersion of the system.

Figure 8D:
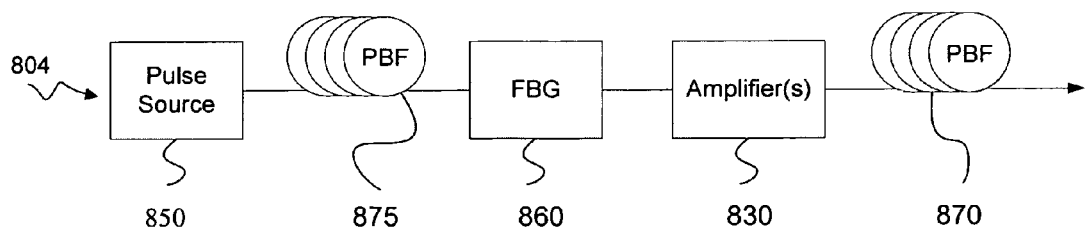

FIG. 8d represents a further embodiment, generally designated 804, comprising a fiber Bragg grating 860 and the photonic bandgap fiber 875 reversed relative to the embodiments illustrated in FIG. 8c.

Figure 8E:
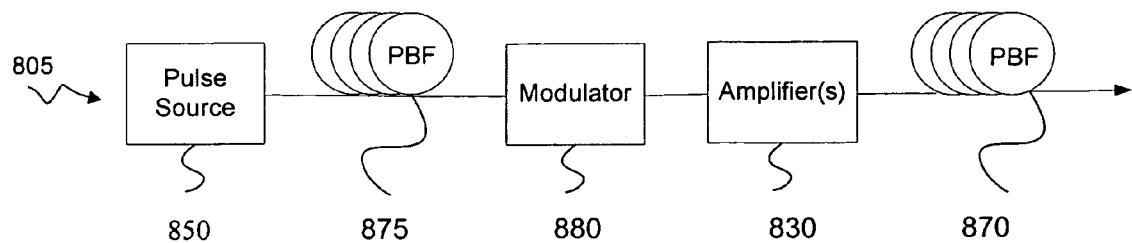

FIG. 8e represents a further embodiment, generally designated 805, comprising a modulator 880, which has characteristics that allow it to fine-tune the overall effect that dispersion has on the system. The modulator 880 is used to alter the phase profile of an optical signal prior to amplification to counteract the effects of upstream or downstream optical dispersions on the propagating signal. In some cases, the modulator 880 may be configured to alter the phase of the optical signal to compensate for first, second, third, and/or higher orders of dispersion. For example, in one embodiment, adding a modulator is a form of signal pre-distortion to account for the undesired residual dispersions and optical nonlinearities in the system. The functional form of the signal used to drive the modulator may be a cubic, quadratic, sine, or cosine function, or an arbitrary function to control the dispersion of the output signal or the spectral width of an output signal.

In some embodiments, the modulator 880 may be used to approximate a Cartesian electric-to-optical converter, such as a dual-parallel Mach-Zehnder modulator, to perform arbitrary E-field modulation. Other modulator devices for this application comprise dual-drive Mach-Zehnder modulators, other Lithium-Niobate devices, liquid crystals, or the like. A pre-distortion technique in which a modulator has been to correct for the residual distortion induced by a compressor has been tried in optical communications as discussed by R. I. Killey, P. M. Watts, V. Mikhailov, M. Glick, and P Bayvel, in "Electronic dispersion compensation by signal predistortion using digital processing and a dual-drive Mach-Zehnder modulator", Photonics Technology Letter 17 (3) March 2005, pp. 714-16.

Figure 8F:
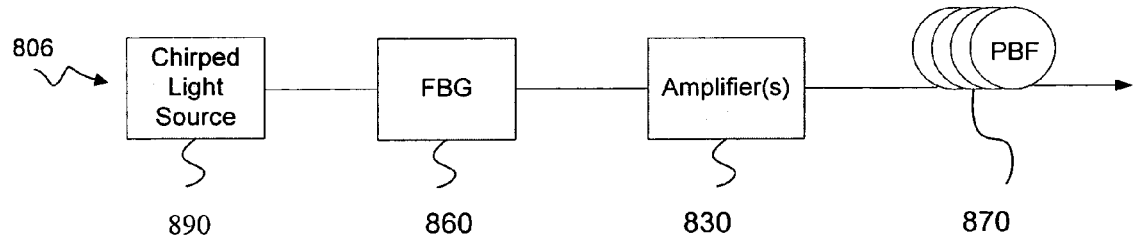

FIG. 8f illustrates further embodiments, generally designated 806, in which a stretched chirped signal is generated directly. For example, this stretched chirped signal may be generated by tuning the output of a Distributed Bragg Reflector ("DBR") laser (as discussed by Brennan et al. in U.S. Pat. No. 6,834,134). In this instance a constant amplitude signal is frequency modulated to create a desired chirped signal. With the use of a DBR laser, further stretching of the signal is generally not required as in CPA systems, but further stretching or compression can be performed prior to signal amplification to match the initial dispersion of the chirped source output to the dispersion of the other elements of the system, (e.g., the compressor dispersion), to control the total dispersion of the system.

Those embodiments illustrated by FIG. 8f comprise a chirped light source 890 configured to generate an optical signal. The combined dispersion of the chirped light source 890 and the fiber Bragg grating 860 is selected or tuned to closely match the dispersion of the photonic bandgap fiber 870 and/or other elements of the system. In some embodiments, the fiber Bragg grating 860 is configured to perform most of the stretch and the chirped light source 890 is configured to be fine-tuned to closely control the total dispersion of the system 806. The function of the fiber Bragg grating 860 may be to compress or to stretch the optical signal.

Figure 8G:
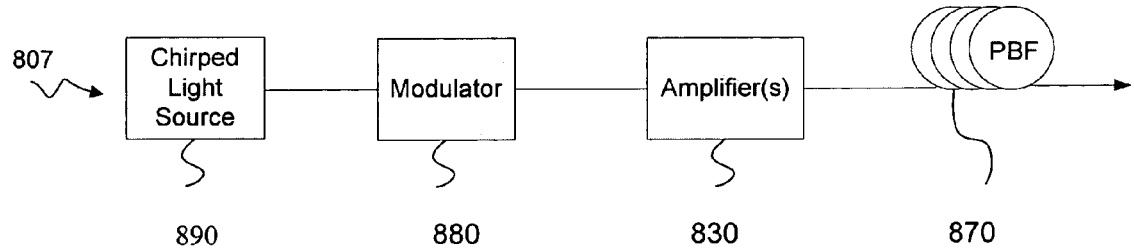

FIG. 8g represents a further embodiment, generally designated 807, comprising a modulator 880 configured to stretch or compress an optical signal received from the chirped light source 890. The modulator 880 can be configured to perform functions similar to the fiber Bragg grating 860 illustrated in FIG. 8f. For example, the modulator 880 compresses the optical signal generated by the chirped light source 890.

Some embodiments of the invention include, a spatial light modulator configured for introducing light in to a photonic bandgap fiber, such as photonic bandgap fiber 870 or 875. For example, in one embodiment, a spatial light modulator or other component capable of generating spatially varying birefringence is configured to select a specific mode (e.g., the $TE_{01}$ mode) for introducing an amplified pulse into photonic bandgap fiber 870, where photonic bandgap fiber 870 includes a Bragg fiber.

Several embodiments are specifically illustrated and/or described herein. However, it will be appreciated that modifications and variations are covered by the above teachings and within the scope of the appended claims without departing from the spirit and intended scope thereof. For example in some embodiments, a photonic bandgap fiber or Bragg fiber grating is disposed across a linear or non-linear gradient in order to control dispersion resulting from the fiber as well as a center of the bandwidth profile. The gradient is optionally tuned to optimize the total dispersion of the system.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   an optical signal generator configured to generate an optical signal;
   an optical signal stretcher configured to stretch the optical signal by dispersing it temporarily as a function of wavelength, thus generating a stretched optical signal;
   an amplifier configured to amplify the stretched optical signal, thus generating an amplified optical signal; and
   a first Bragg fiber configured to compress the amplified optical signal to generate an optical pulse, the first Bragg fiber configured to correct high-order dispersion.

2. The system of claim 1, wherein the optical signal stretcher comprises a fiber Bragg grating.

3. The system of claim 1, wherein the optical signal stretcher comprises a fiber Bragg grating and a photonic bandgap fiber.

4. The system of claim 3, wherein the photonic bandgap fiber is a second Bragg fiber or a photonic crystal fiber.

5. The system of claim 3, wherein the fiber Bragg grating is selected responsive to temporal dispersion of the first Bragg fiber and the photonic bandgap fiber in order to optimize the temporal dispersion of the optical pulse.

6. The system of claim 1, wherein the optical signal stretcher comprises a photonic bandgap fiber and a modulator.

7. The system of claim 1, wherein the optical signal generator is controllable to modify the temporal dispersion of the optical signal to optimize the temporal dispersion of the optical pulse.

8. The system of claim 1, wherein the first Bragg fiber is selected in response to the temporal dispersion of the optical signal stretcher to optimize the temporal dispersion of the optical pulse.

9. The system of claim 1, wherein the optical signal stretcher is selected to optimize the temporal dispersion of the optical pulse.

10. The system of claim 1, wherein the optical signal stretcher is manufactured to optimize the temporal dispersion of the optical pulse.

11. The system of claim 1, wherein the optical signal stretcher and the first Bragg fiber are matched to optimize the temporal dispersion of the optical pulse.

12. The system of claim 1, wherein the optical pulse has a duration of less than 10 psec.

13. The system of claim 1, wherein the optical pulse has an energy of greater than 10 nJ per pulse.

14. The system of claim 1, wherein the optical pulse is delivered to a target for ablation.

15. A system comprising:
an optical signal generator configured to generate a chirped optical signal;
a fiber Bragg grating or a modulator configured to stretch or compress the chirped optical signal as a function of wavelength;
an amplifier configured to amplify the stretched or compressed optical signal, thus generating an amplified optical signal; and
a first Bragg fiber configured to compress the amplified optical signal to generate an optical pulse as an output of the system, the first Bragg fiber configured to correct high-order dispersion.

16. The system of claim 15, wherein the optical signal generator is controllable to optimize dispersion of the output of the system.

17. The system of claim 15, wherein the fiber Bragg grating or modulator are further configured to optimize the dispersion of the output of the system.

18. The system of claim 15, wherein the optical signal generator includes a distributed Bragg Reflector laser.

19. The system of claim 15, wherein the first Bragg fiber is disposed across a stress gradient configured to control a dispersion profile of the first Bragg fiber.

20. A method of producing an optical pulse, comprising:
generating an optical signal;
stretching the optical signal to generate a stretched optical signal;
amplifying the stretched optical signal to generate an amplified optical signal; and
compressing the amplified optical signal to generate an optical pulse using a Bragg fiber, the first Bragg fiber configured to correct high-order dispersion.

21. The method of claim 20, wherein the step of stretching the optical signal further comprises introducing the optical signal into a fiber Bragg grating.

22. The method of claim 20, wherein the step of stretching the optical signal further comprises introducing the optical signal into a photonic bandgap fiber and a fiber Bragg grating, wherein both the photonic bandgap fiber and the fiber Bragg grating stretch the optical signal.

23. The method of claim 20, wherein the step of stretching the optical signal further comprises introducing the optical signal into a photonic bandgap fiber and a fiber Bragg grating, wherein the photonic bandgap fiber stretches and the fiber Bragg grating compresses the optical signal.

24. The method of claim 20, wherein the optical pulse has a duration of less than 10 psec.

25. The method of claim 20, wherein the optical pulse has an energy of greater than 10 nJ per pulse.

26. The method of claim 20, further including delivering the optical pulse to a target for ablation.

27. The method of claim 20, wherein the step of compressing the amplified optical signal or the step of stretching the optical signal includes selecting an optical mode for introduction into a photonic bandgap fiber or a fiber Bragg grating.

28. The method of claim 20, further including selecting a TE01 mode prior to amplifying the stretched optical signal.

* * * * *